United States Patent
Shaik et al.

(10) Patent No.: US 10,355,478 B2
(45) Date of Patent: Jul. 16, 2019

(54) SYSTEM AND METHOD FOR ASSET HEALTH MONITORING USING MULTI-DIMENSIONAL RISK ASSESSMENT

(71) Applicant: Cooper Technologies Company, Houston, TX (US)

(72) Inventors: Fiaz Shaik, Pune (IN); Milind Suresh Kothekar, Maharashtra (IN)

(73) Assignee: Eaton Intelligent Power Limited, Dublin (IE)

(*) Notice: Subject to any disclaimer, the term of this patent is extended or adjusted under 35 U.S.C. 154(b) by 101 days.

(21) Appl. No.: 15/465,855

(22) Filed: Mar. 22, 2017

(65) Prior Publication Data
US 2018/0278055 A1   Sep. 27, 2018

(51) Int. Cl.
| H02J 3/00 | (2006.01) |
| G05B 23/02 | (2006.01) |
| G06Q 10/00 | (2012.01) |
| G06Q 10/06 | (2012.01) |
| G06Q 50/06 | (2012.01) |
| H02J 13/00 | (2006.01) |

(52) U.S. Cl.
CPC ............ *H02J 3/00* (2013.01); *G05B 23/0283* (2013.01); *G06Q 10/0635* (2013.01); *G06Q 10/20* (2013.01); *G06Q 50/06* (2013.01); *H02J 13/0013* (2013.01); *H02J 2003/007* (2013.01); *Y02E 40/76* (2013.01); *Y04S 10/545* (2013.01)

(58) Field of Classification Search
None
See application file for complete search history.

(56) References Cited

U.S. PATENT DOCUMENTS

| 7,660,649 B1 * | 2/2010 | Hope .................... G06Q 10/04 700/28 |
| 8,121,740 B2 | 2/2012 | Yang et al. |

(Continued)

OTHER PUBLICATIONS

Vaiman et al., "Calculation and Visualization of Power System Stability Margin Based on PMU Measurements," 2010 First IEEE International Conference on Smart Grid Communications, Nov. 2010, pp. 1-6.

(Continued)

*Primary Examiner* — Ryan A Jarrett
(74) *Attorney, Agent, or Firm* — Ziolkowski Patent Solutions Group, SC

(57) ABSTRACT

A power distribution network includes a plurality of power source nodes and component nodes, which direct power from the plurality of power source nodes to a plurality of load nodes; a plurality of sensors positioned to sense power flow information for the plurality of power source and component nodes; and a data warehouse housing the power flow information and diagnostic data for the plurality of power source and component nodes. The power distribution network also includes a control system configured to retrieve the power flow information and the diagnostic data; generate stress and health indices and compute a criticality for each of the power source and component nodes; and generate a risk index for each of the power source and component nodes based on their respective stress index, health index, and criticality. The risk index of each node represents the risk the node poses to the power distribution network.

20 Claims, 6 Drawing Sheets

(56) References Cited

U.S. PATENT DOCUMENTS

| | | | |
|---|---|---|---|
| 8,965,591 B2 | 2/2015 | San Andres et al. | |
| 9,118,182 B2 | 8/2015 | McDonald et al. | |
| 9,250,674 B2 | 2/2016 | San Andres et al. | |
| 2005/0033480 A1* | 2/2005 | Schlueter | H02J 3/00 700/286 |
| 2011/0130982 A1 | 6/2011 | Haag et al. | |
| 2012/0316688 A1 | 12/2012 | Boardman et al. | |
| 2013/0003238 A1 | 1/2013 | Bush et al. | |
| 2013/0184889 A1 | 7/2013 | Fan et al. | |
| 2013/0282189 A1 | 10/2013 | Stoupis et al. | |
| 2014/0149101 A1 | 5/2014 | Huang et al. | |
| 2014/0156225 A1 | 6/2014 | Dagnino et al. | |
| 2016/0036226 A1* | 2/2016 | Gan | H02J 3/00 700/286 |

OTHER PUBLICATIONS

"Advanced Distribution Management System (ADMS)," schneider-electric.com, 2016, http://www.schneider-electric.com/b2b/en/solutions/for-business/s4/electric-utilities-advanced-distribution-management-system-adms/.

\* cited by examiner

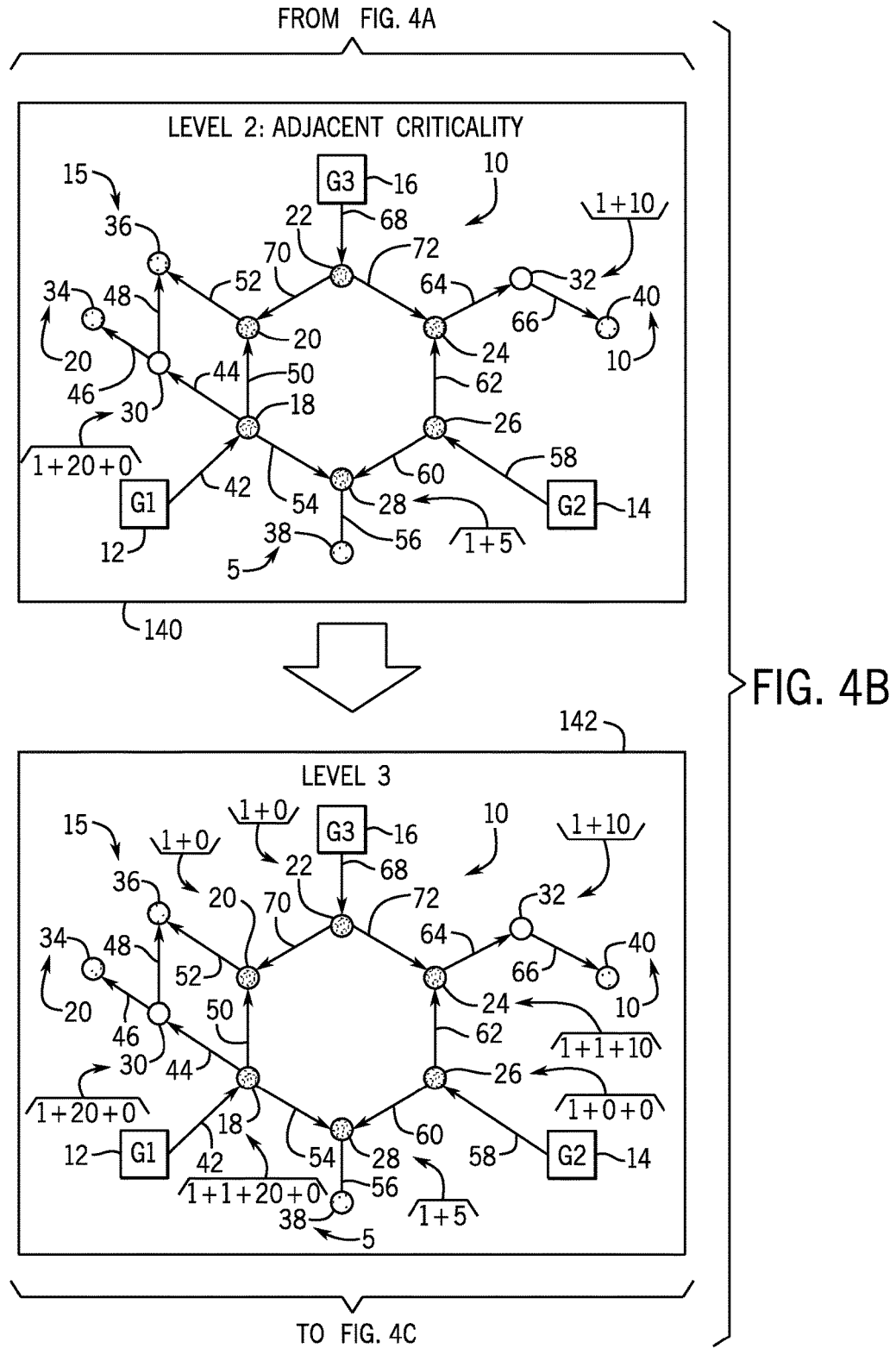

SYSTEM AND METHOD FOR ASSET HEALTH MONITORING USING MULTI-DIMENSIONAL RISK ASSESSMENT

BACKGROUND OF THE INVENTION

The present invention relates generally to asset health monitoring and, more particularly, to a system and method for asset health monitoring using a multi-dimensional risk assessment.

A power distribution system/network or electrical grid/network ordinarily requires many components or assets to supply and transmit electrical power to loads that are connected to the power system. A power system may include, for example, generators, power stations, transmission systems, and distribution systems. Generators and power stations supply electrical power to transmission systems, which then transmit the electrical power to distribution systems. Distribution systems deliver the electrical power to loads such as, for example, residential, commercial, and industrial buildings. The necessary components or equipment to operate the transmission and distribution systems may include, for example, transformers, circuit breakers, relays, reclosers, capacitor banks, buses, and transmission lines. Those components can be quite expensive to replace, especially in a large power system with thousands of those components. To keep track of the condition of those components, many power systems implement asset health monitoring.

Asset health monitoring includes analyzing data about power system components in order to assess the risk of failure. Once the risk of failure has been determined, decisions can be made about when to perform maintenance on or replace the power system components and how to reconfigure the power flow in the system in order to perform the maintenance on or replace the components. In other words, if the asset health monitoring reveals that a power system component needs to be repaired or replaced, a course of action can be planned ahead of a system fault. However, maintenance personnel are usually limited in number and need to service a large number of assets over a fixed amount of time. Thus, it is crucial to manage the time spent by the maintenance personnel as efficiently as possible. If maintenance of a power system is not managed properly or disregarded entirely, the power system will eventually fail.

Various asset health monitoring techniques are used to determine when to perform maintenance on a power system component. A depth first approach may be used for network model maintenance. Predictive modeling techniques such as, for example, clustering, classification, association analysis, pattern discovery, regression, and anomaly detection may also be used. Mean absolute percentage error for pattern recognition may be implemented to forecast the load on the power system.

Depending on the technique used, the technique may leverage data from several different sources. The data used to manage power system maintenance may include information from an advanced metering infrastructure that may have a variety of meters in the system; a phasor measurement unit used to measure the electrical waves of the electrical grid; intelligent electronic devices that monitor, control, automate, and/or protect monitored equipment within the power system; or individual component sensors, for example. Offline data such as, for example, historical sensor data, field test and service data, or network model data may also be used.

However, the above-referenced asset health monitoring techniques suffer from deficiencies. In general, the asset health monitoring techniques do not take advantage of all the information relevant to assessing how much risk a deteriorating component poses to a power system. For example, while an asset health monitoring technique may consider data concerning equipment being monitored, it may not take into account data concerning other power system equipment that may be relevant to the future operation and of the monitored equipment. As an additional example, some asset health monitoring techniques use only historical fault and maintenance data to predict when a component will fail without incorporating any current information relevant to the condition of the component.

Furthermore, asset health monitoring techniques typically do not consider all of the factors influenced by the information collected. For example, asset health monitoring techniques often ignore the impact of a component failure or taking the component offline for maintenance. Moreover, asset health monitoring techniques fail to take into account the availability and accuracy of diagnostic information for power system equipment.

It would therefore be desirable to provide a system and method for asset health monitoring that assesses the risk of failure of power system component using all relevant data in order to optimize the efficiency of maintenance personnel.

BRIEF DESCRIPTION OF THE INVENTION

Embodiments of the present invention provide a system and method for assessing the risk posed to a power distribution network by components within the power distribution network by analyzing the stress, health, and criticality of the components within the network.

In accordance with one aspect of the invention, a power distribution network includes a plurality of power source nodes and component nodes. The component nodes direct power from the plurality of power source nodes to a plurality of load nodes. The power distribution network further includes a plurality of sensors positioned to sense power flow information for the plurality of power source and component nodes and a data warehouse housing the power flow information and diagnostic data for the plurality of power source and component nodes. The power distribution network additionally includes a control system configured to retrieve the power flow information and the diagnostic data for the plurality of power source and component nodes from the data warehouse. The control system is also configured to generate a stress index for each of the power source and component nodes from the power flow information, generate a health index for each of the power source and component nodes from the diagnostic information, and compute a criticality for each of the power source and component nodes using a model of the power distribution network. Furthermore, the control system is configured to generate a risk index for each of the power source and component nodes based on their respective stress index, health index, and criticality. The risk index of each node represents the risk the node poses to the power distribution network.

In accordance with another aspect of the invention, a control system for assessing the risk of node failure to a power system having at least one power source node and a plurality of component nodes positioned to provide power from the at least one power source node to at least one load node is configured to extract power flow information and diagnostic information for the plurality of component nodes and the at least one power source node. The control system is also configured to convert the power flow information into a stress index for each component node, convert the diagnostic information and the stress index into a health index for each component node, and determine the criticality of each component node. The control system is further configured to convert the stress index, the health index, and the criticality of each component node into a respective risk index that symbolizes the risk each component node poses to the power system.

In accordance with yet another aspect of the invention, a method for assessing the risk that power system assets pose to a power system includes defining at least one power source node and a plurality of component nodes within the power system. The plurality of component nodes are positioned to provide power from the at least one power source node to at least one load node. The method further includes obtaining power flow information and diagnostic information for the power source and component nodes from a data warehouse, transforming the power flow information into a stress index for each of the power source and component nodes, transforming the diagnostic information into a health index for each of the power source and component nodes, and evaluating a criticality for each of the power source and component nodes using a model of the power distribution network. The method also includes transforming the stress index, the health index, and the criticality of each power source and component node into a respective risk index, each risk index indicating the risk a node poses to the power distribution network.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIGS. 4A, 4B, and 4C are a flow chart illustrating an example of how to calculate the criticality of the nodes of the power distribution system of FIG. 1, according to the technique of FIG. 3.

DETAILED DESCRIPTION

Embodiments of the invention relate to a system and method for assessing the risk that power system components pose to a power system by converting information on the power flow within the power system, diagnostic information for power system components, and information from a network model into a health index, a stress index, and a criticality for each power system component. The health index, stress index, and criticality of each component are transformed into a risk index that indicates how much risk the component poses to the power system. The risk indices for the various components may be used to develop a maintenance strategy and/or re-route power flow within the power system.

Figure 1:
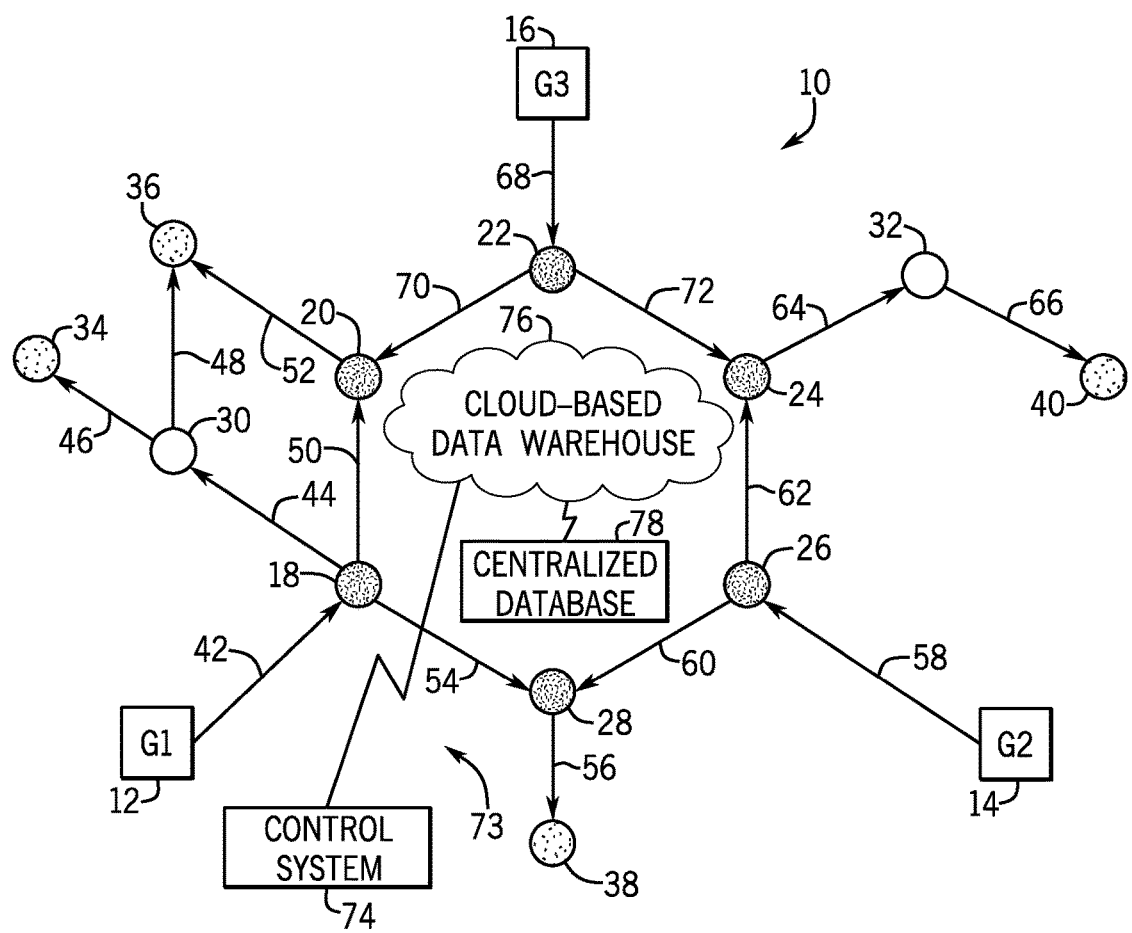
FIG. 1 is a diagram of a power distribution system, according to an embodiment of the invention.

Referring to FIG. 1, a diagram of a power distribution system or network 10 is illustrated, according to an embodiment of the invention. The diagram of power system 10 is a network model and includes a number of nodes 18-40 that represent power sources, components, and loads and edges 42-72 that represent an electrical link connecting any two nodes such as, for example, overhead lines and underground cables. Nodes 12, 14, 16 represent power sources that supply power within power system 10. The power sources may include any type of power source such as, for example, power stations, generators, and alternative energy sources (solar, hydroelectric, wind, etc.). Nodes 18, 20, 22, 24, 26, 28, 30, 32 represent components within power system 10. The components may include any type of component necessary for transmitting or distributing power within a power system such as, for example, load and generator buses, circuit breakers, capacitor banks, reclosers, and relays. Nodes 34, 36, 38, 40 represent loads. The loads may include any type of load that may be powered by a power system such as, for example, residential, commercial, and industrial buildings.

Each edge 42-72 is a vector indicating a direction of power flow using an arrow. For example, edge 42 shows that power flows from power source node 12 to component node 18, edge 44 shows that power flows from component nodes 18 to component node 30, and edge 46 shows that power flows from component node 30 to component node 34. As such, the network model of power system 10 may be considered a directed graph. The directed graph may be created using topology and power flow information available for power system 10.

The power flow information and diagnostic information for components in power system 10 may be available from a sensor system (not shown) having a variety of sensing devices such as, for example, a plurality of individual sensors placed at various nodes and edges in power system 10, an advanced metering infrastructure having a variety of meters in power system 10, and/or a phasor measurement unit measuring the electrical waves of power system 10. In addition, any of component nodes 18-40 may be intelligent electronic devices that monitor, control, automate, and/or protect monitored equipment within the power system such as, for example, differential, distance, directional, feeder, overcurrent, voltage, breaker failure, generator, and motor relays, voltage regulator controls, automation controllers, remote terminal units, bay controllers meters, recloser controls, communications processors, computing platforms, programmable logic controllers, programmable automation controllers, and input and output modules. Also, since having a multitude of sensors within a power system can be quite expensive, some power flow information may be derived instead of using a sensor. Offline data such as, for example, historical sensor data, field test data, or network model data, may also be used in creating the directed graph.

Power system 10 further includes data management and control system 73 including a control system 74, a cloud-based data warehouse 76, and a centralized database 78. As will be described in more detail below with respect to FIG. 2, control system 74 is able to access cloud-based data warehouse 76 to analyze power flow information and diagnostic information for power system 10 in order to determine the best course of controlling power source and component nodes 12-32. While control system 74 is shown as one control system in one location, control system 74 may include a variety of controllers at multiple locations so that power system 10 may be controlled as efficiently as possible.

The information from the sensor system of power system 10 is typically stored in database 78 at one centralized location chosen based on economic considerations. As a non-limiting example, the information may be stored at the headquarters for power system 10. The information from the sensor system of power system 10 is then uploaded to data warehouse 76. A cloud-based data warehouse is generally used in order to allow the information about power system 10 to be accessed from any location. However, the information may only be stored on physical databases. Data warehouse 76 is also able to access various other types of data from the Internet and from other databases (not shown) of power system 10 such as, for example, forecasting data for loads, power generation, and weather and logistic data including costs for repairs of power system components and availability of critical components.

Figure 2:
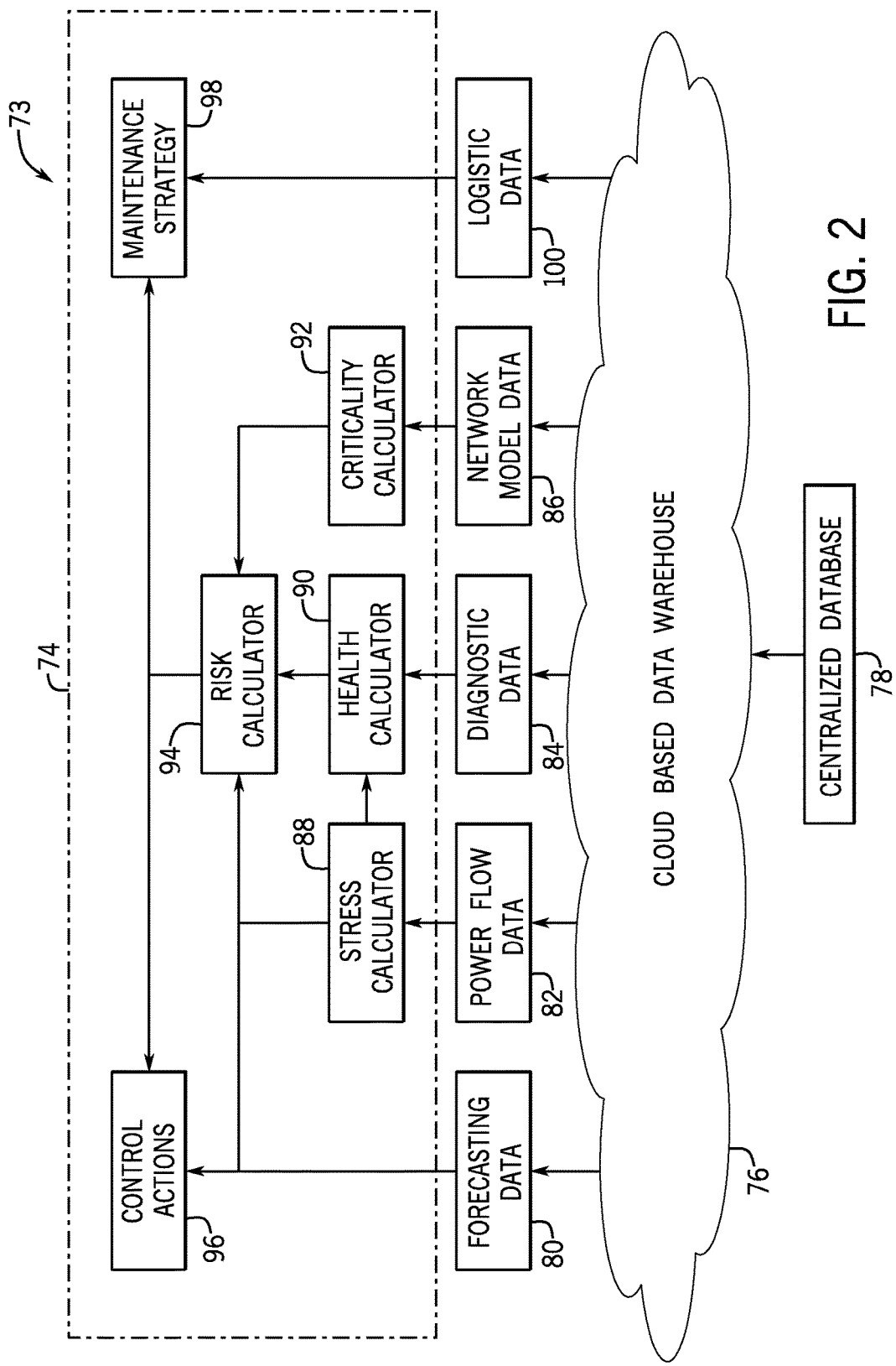
FIG. 2 is a block diagram of a data management and control system of the power distribution system of FIG. 1, according to an embodiment of the invention.

Referring now to FIG. 2, a block diagram of data management and control system 73 of power system 10 of FIG. 1 is shown, according to an embodiment of the invention. As described above, centralized database 78 receives information from the sensor system of power system 10. The sensor information includes power flow information and diagnostic information for power source and components nodes 12-32 as well as edges 42-72. The sensor information and forecasting and logistic data is uploaded to the cloud-based data warehouse 76. From the data stored in data warehouse 76, control system 74 is able to calculate a risk index for each power source and component node 12-32 in power system 10 that is indicative of the risk that each power source and component node 12-32 poses to power system 10.

Control system 74 retrieves or extracts forecasting, power flow, diagnostic, and network model information or data 80, 82, 84, 86 as needed from data warehouse 76 as inputs to a stress calculator 88, and health calculator 90, a criticality calculator 92, and a risk calculator 94 to determine the risk posed to power system 10 by each power source and component node 12-32. Power flow information 82 includes any type of information relevant to the stress on the power sources and components of power system 10 such as, for example, data on current, voltage, and power surges, sags, and failures. Control system 74 analyzes power flow information 82 and, using stress calculator 88, generates a stress index for each power source and component node 12-32 indicative of how much stress each respective power source and component node 12-32 is experiencing. The environmental conditions of a power source or component node may also be taken into account if the node has been under extreme temperatures, wind, and other environmental stresses. The stress index for any node 12-32 is calculated based on how the current state of the power flow in the node compares to the nominal rating of the power flow within the node. As a non-limiting example, a circuit breaker with a higher than rated current flowing through it is under stress, and control system 74 will, therefore, give the circuit breaker a higher stress index.

Diagnostic information 84 retrieved from data warehouse 76 by control system 74 includes information relevant to the health of the power source and component nodes 12-32 such as, for example, historic fault and maintenance information and present diagnostic information. The historic fault and maintenance information for a node may include information such as, for example, how many times the power source or component has failed or been repaired. The present diagnostic information may be online sensor information from the sensor system of power system 10 or may be derived from other known diagnostic information. By using derived diagnostic information, power system 10 does not need as many sensors to save on cost. Control system 74 inputs the stress index generated by stress calculator 88 and diagnostic information 84 into health calculator 90.

FIG. 2 illustrates that health calculator 90 analyzes the stress index and diagnostic data 84 and generates a health index for each power source and component node 12-32. However, in various embodiments, health calculator 90 generates the health index for each power source and component node 12-32 based on an analysis of diagnostic data 84 alone. In addition, sometimes diagnostic information is unavailable or inaccurate for some power source and component nodes 12-32 for a variety of reasons such as, for example, no sensors are positioned to sense data for that node or only some of data associated with a node is sensed. In that case, health calculator 90 generates a health index based on the stress index for that node and the fact that no diagnostic information is available. The availability of diagnostic information for a node is an important factor for evaluating the risk the node poses to power system 10. A critical node with no available diagnostic information will have a high degree of risk associated with it. Without diagnostic information on a node, there is no way for the control system to determine exactly how healthy it is.

Network model information 86 obtained from data warehouse 76 by control system 74 includes updates to the network model that represents power system 10. As a non-limiting example, an additional component or power source node may be added to the network model, which may also change the direction of power flow on edges 42-72 of power system 10. As will be described in more detail with respect to FIG. 3, control system 74 analyzes the network model and determines a criticality for each power source and component node 12-32 in power system 10 using criticality calculator 92. The criticality of the power source and component nodes 12-32 are based on how many consumers will lose power if the node fails. The criticality of a node is independent of the stress on the node because it only pertains to the availability of power.

Once a stress index, a health index, and a criticality of each power source and component node 12-32 of power system 10 is calculated by respective stress, health, and criticality calculators 88, 90, 92, these risk factors are normalized according to how much risk they pose to power system 10. The normalization process may be nonlinear or linear and can be manipulated to suit the needs of power system 10. In one embodiment, each of the risk factors is normalized on a scale of 1 to 10.

Control system 74 inputs the normalized stress index, health index, and criticality for each power source and component node 12-32 into risk calculator 92. Control system 74 also inputs forecasting information 80 into risk calculator 92. Forecasting information 80 includes information relevant to the future power flow in and stresses on power system 10 such as, for example, load forecasting, power generation forecasting, and weather forecasting information. In various embodiments, forecasting information 80 is also normalized before being input into risk calculator 92. Risk calculator 92 analyzes the stress index, health index, criticality, and forecasting information for each power source and component node 12-32 and generates a respective risk index. Control system 74 then ranks or prioritizes each power source and component node 12-32 according to how much risk it poses to power system 10 in a prioritized list. Control system 74 then continuously updates the prioritized list of power source and component nodes 12-32 so that the risk posed to power system 10 is continually monitored.

There are various ways a risk index may be calculated and various ways power source and component nodes 12-32 may be ranked by the amount of risk they pose to power system 10. The following is a non-limiting example of how to calculate a risk index for and rank the power source and component nodes 12-32 of power system 10. First, the stress index, health index, and criticality of each node are normalized on a scale of 1 to 10. Next, any node having a health index greater than or equal to 9 is ranked at the highest priority regardless of the stress and criticality of the node. This is because a health index of 9 or higher indicates that the node is close to failing and there is not much time left to fix it. Then, the nodes with a health index less than 9 are examined according to stress index. If the health index of a node multiplied by the stress index of a node is greater than or equal to 72, that node is identified as the second highest priority irrespective of the criticality of the node because these nodes are fast deteriorating due to the stress on them and face immediate threat of bringing down part of power system 10.

After the highest and second highest priority nodes have been identified the remaining nodes are prioritized by multiplying each of their respective stress indices, health indices, and criticalities together. Once power source and component nodes 12-32 have been ranked according to health index, stress index, and criticality, control system 74 analyzes forecasting information 80 to determine if any nodes are expected to experience bad weather, high load, or low power generation. Control system 74 will then reprioritize the nodes accordingly. After forecasting information 80 has been taken into account each power source and component node 12-32 has been ranked or prioritized according to the risk it poses to power system 10.

Regardless of the method used to create the prioritized list of power source and component nodes 12-32, control system 74 may use that prioritized list to perform control actions 96 on power system 10 and develop a maintenance strategy 98. Control actions 96 include any action taken by control system 74 to alter the power flow within power system 10. As a non-limiting example, control system 74 may re-route power to a load node 34-40 through a different component node 18-32 if a component node 18-32 is close to failing or deteriorating quickly. As another non-limiting example, control system 74 may shed a non-critical load, such as a residence, for a period of time to reduce stress on power source or component nodes 12-32 or to reserve power for critical loads such as a data center or a hospital. Control system 74 may keep a prioritized list of loads for the purpose of load shedding. As yet another non-limiting example, control system 74 may take a power source node 12-16 offline in anticipation of a failure and re-route power from the other power source nodes to component and load nodes 18-40 to compensate for the offline power source node. For instance, control system 74 may disconnect power source node 12 from component node 18 if power source node 12 is about to fail or is deteriorating quickly and re-route power from power source nodes 14, 16 to component nodes 18, 44 and load node 46 to compensate for the loss of power source node 12.

In developing maintenance strategy 98, control system 74 uses not only the prioritized list of power source and component nodes 12-32, but also logistic information or data 100 extracted from data warehouse 76. Logistic information 100 may include information including, but not limited to, the cost involved in repair of a component and the availability and cost of replacement components. Control system 74 may perform a cost analysis on repairing and replacing components using logistic information 100. Thus, maintenance strategy 98 may include a recommendation to immediately service or replace power source or component nodes 12-32 that pose a high risk to power system 10. The prioritized list and maintenance strategy 98 may then be used by maintenance personnel to schedule maintenance on power source and component nodes 12-32 that have the most need for maintenance so they can better manage their time. Because the risk each power source and component node 12-32 poses to power system 10 is known, maintenance personnel can determine how best to manage their time to address the needs of power system 10 without allowing any node of power system 10 to fail.

Figure 3:
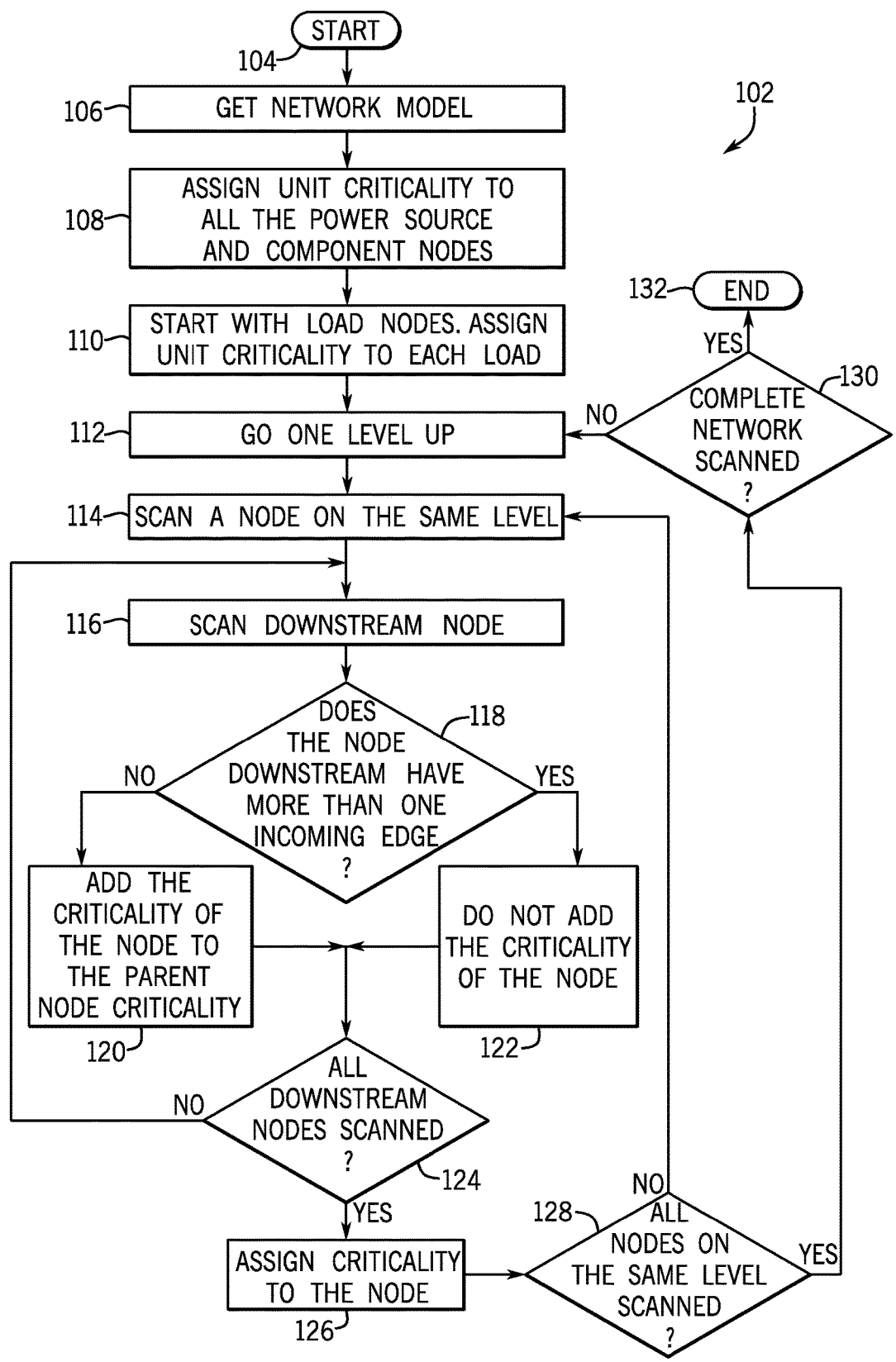
FIG. 3 is a flow chart setting forth exemplary steps of a technique for calculating the criticality of nodes of a power distribution system, according to an embodiment of the invention.

Referring now to FIGS. 3-4, a flow chart setting forth exemplary steps of a technique 102 for calculating the criticality of nodes of a power distribution system is shown, according to an embodiment of the invention. Process 102 begins at STEP 104 when a control system, such as control system 74 of data management and control system 73 of power system 10, begins calculating the risk a node poses to a power distribution system. At STEP 106, the control system retrieves or extracts a network model from a data warehouse or database such as cloud-based data warehouse 76 of data management and control system 73. At STEP 108, the control system assigns a unit criticality to all the nodes of the power system. At STEP 110, the control system assigns a criticality to each load node. At STEP 112, after each load node has been assigned a criticality, the control system moves to analyze the next level of the power system having the nodes directly upstream from the load nodes.

At STEP 114, the control system scans a node on the newly entered level of the power system. At STEP 116, the control system scans a node directly downstream from the node scanned at STEP 114. At STEP 118, the control system determines whether the node scanned at STEP 116 has more than one incoming edge. In other words, the control system determines if the node scanned at STEP 116 has more than one node directly upstream from it. If the node scanned at STEP 116 does not have any additional incoming edges, process 102 moves to STEP 120, and the control system adds the criticality of the node scanned at STEP 116 to the node scanned at STEP 114. If the node scanned at STEP 116 does have additional incoming edges, process 102 moves to STEP 122, and the control system does not add the criticality of the node scanned at STEP 116 to the criticality of the node scanned at STEP 114.

After performing either STEP 120 or STEP 122, process 102 moves to STEP 124, and the control system determines whether all nodes downstream from the node scanned at STEP 114 have been scanned. If not all the nodes downstream from the node scanned at STEP 114 have been scanned, process 102 moves to STEP 116, and the control system scans an additional downstream node. If all the nodes downstream from the node scanned at STEP 114 have been scanned, process 102 moves to STEP 126, and control system assigns a criticality to the node scanned at STEP 114 criticality summation made at STEPS 120 and 122.

At STEP 128, the control system determines whether all the nodes on the same level as the node scanned at STEP 114 have been scanned. If not all the nodes on the same level as the node scanned at STEP 114 have been scanned, then process 102 moves to STEP 112, and the control system scans an addition node. If all the nodes on the same level as the node scanned at STEP 114 have been scanned, then process 102 moves to STEP 130, and the control system determines whether the network has been completely scanned. If the network has not been completely scanned, process 102 moves to STEP 112, and the control system moves to analyze the next level of the power system having the nodes directly upstream from the nodes on the same level as the node scanned at STEP 114. If the network has been completely scanned, process 102 ends at STEP 132.

Figure 4A:
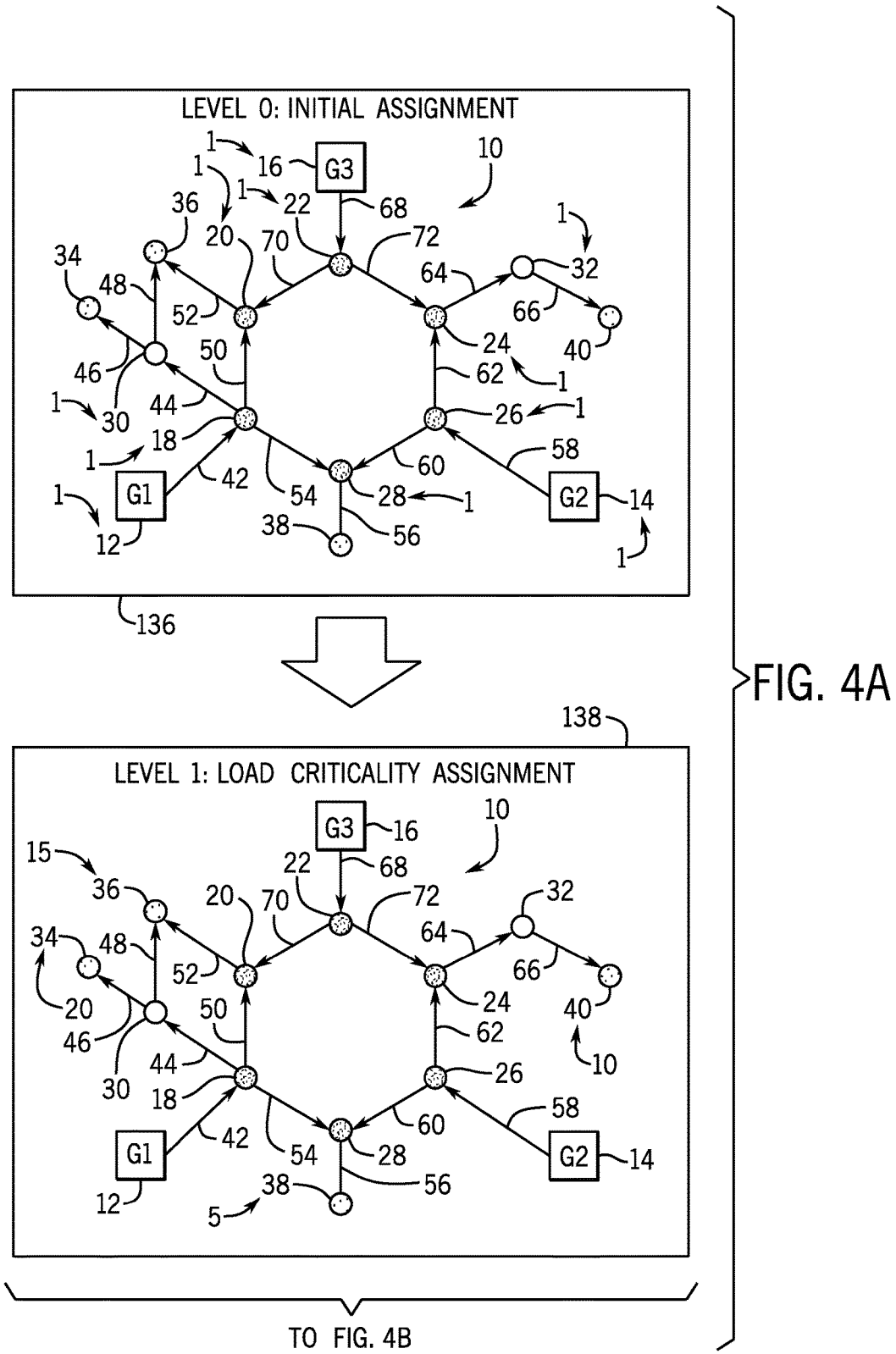
Figure 4C:
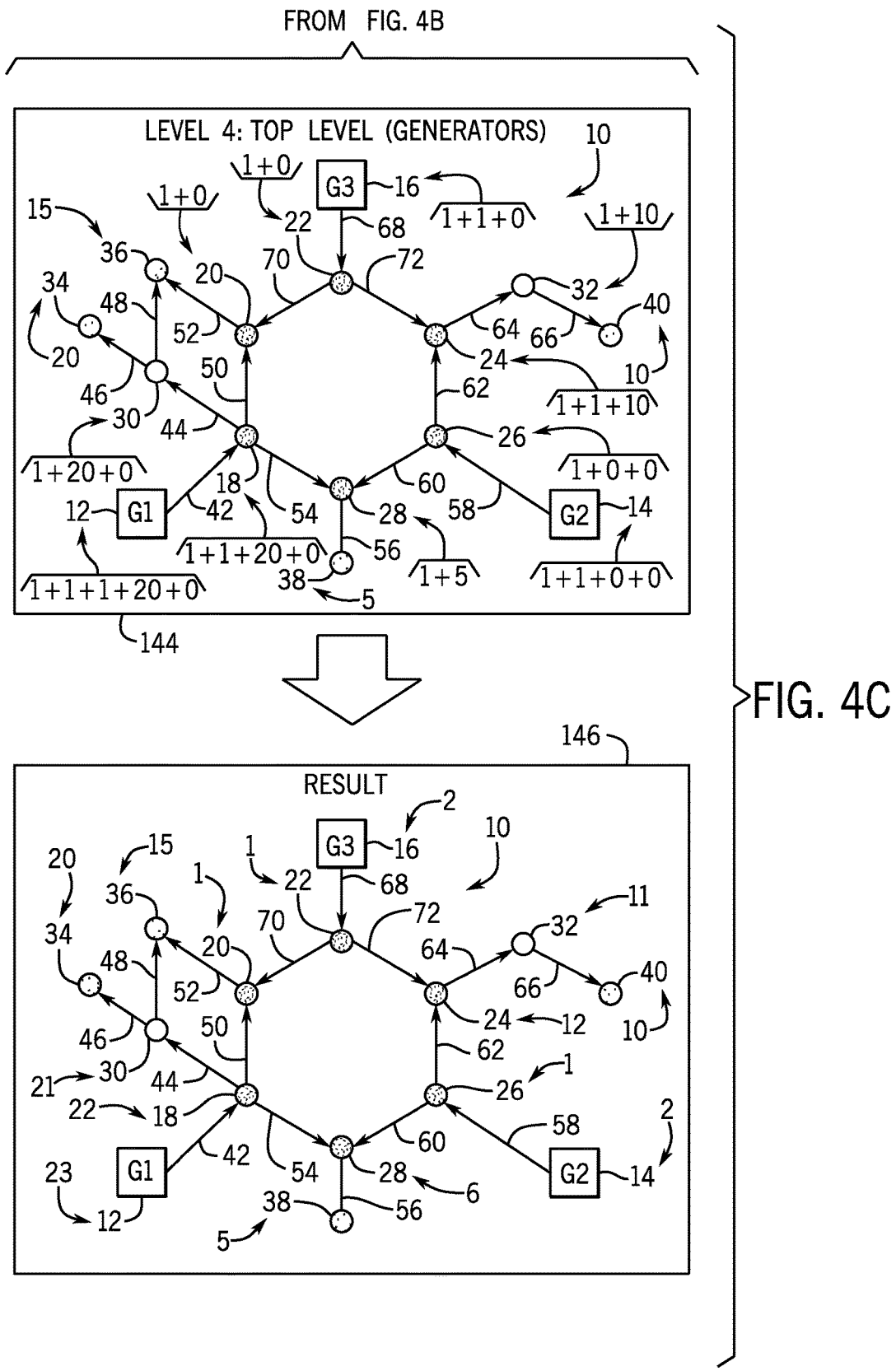

Referring now to FIGS. 4A, 4B, and 4C, a flow chart illustrates an example criticality calculation 134 of power source and component nodes 12-32 of power distribution system 10 of FIG. 1 according to technique 102 of FIG. 3. Example criticality calculation 134 is shown by way of six panels 136, 138, 140, 142, 144, 146. Panel 136 shows the network model of power system 10 and the initial assignment of the nodes (Level 0) at STEPS 106 and 108 of process 102. Control system 74 of data management and control system 73 of power system 10 assigns each power source and component node 12-32 a unit criticality or a criticality of 1. In panel 138, control system 74 assigns load nodes 34, 36, 38, and 40 a criticality of 20, 15, 5, and 10, respectively, (Level 1) at STEP 110 of process 102. In this particular example, it is assumed that each load node 34, 36, 38, 40 has sub-loads of 20, 15, 5, 10, respectively.

In panel 140, control system 74 moves to the level of nodes directly upstream from load nodes 34-40 including component nodes 28, 30, 32 (Level 2) at STEP 112 of process 102. Control system 74 then follows STEPS 114-128 of process 102 to determine the criticality component nodes 28, 30, 32 before moving on to the next level of nodes of power system 10 in panel 144, as described in more detail below. At STEP 114 of process 102, control system 74 scans component node 28. Control system 74 then scans load node 38 directly downstream from component node 28 at STEP 116 of process 102, determines that load node 38 does not have any edges in addition to edge 56 linking component node 28 and load node 38 at STEP 118 of process 102, and adds the criticality of load node 38 to the criticality of component node 28 for a total criticality of 6 at STEP 120 of process 102. Control system 74 determines that component node 28 has no more downstream nodes at STEP 124 of process 102 and assigns a criticality of 6 to component node 28 at STEP 126 of process 102. Control system 74 then determines at STEP 128 of process 102 that component nodes 30 and 32 still need to be scanned and scans component node 30 at STEP 114 of process 102.

At STEP 116 of process 102, control system 74 scans load node 34 and determines that load node 34 does not have any edges in addition to edge 46 linking component node 30 and load node 34 at STEP 118 of process 102. At STEP 120 of process 102, control system 74 adds the criticality of load node 34 to the criticality of component node 30 for a total criticality of 21 and determines that load node 36 needs to be scanned at STEP 124 of process 102. Control system 74 scans load node 36 at STEP 116 of process 102, determines that load node 36 has an incoming edge 52 in addition to incoming edge 48 linking component node 30 and load node 36 at STEP 118 of process 102, and does not add the criticality of load node 36 to the criticality of component node 30 at STEP 122 of process 102. Control system 74 determines that component node 30 has no more downstream nodes at STEP 124 of process 102 and assigns a criticality of 21 to component node 30 at STEP 126 of process 102. Control system 74 then determines at STEP 128 of process 102 that component node 32 still needs to be scanned and scans component node 32 at STEP 114 of process 102.

At STEP 116 of process 102, control system 74 scans load node 40 and determines that load node 40 does not have any edges in addition to edge 66 linking component node 32 and load node 40 at STEP 118 of process 102. At STEP 120 of process 102, control system 74 adds the criticality of load node 40 to the criticality of component node 32 for a total criticality of 11. Control system 74 determines that component node 32 has no more downstream nodes at STEP 124 of process 102 and assigns a criticality of 11 to component node 32 at STEP 126 of process 102. At STEP 128 of process 102, control system 74 determines that all the nodes on the current level have been scanned and determines that the complete network has not been scanned at STEP 130 of process 102.

In panel 142, control system 74 moves to the level of nodes directly upstream from component nodes 28, 30, 32 including component nodes 18, 20, 22, 24, 26 (Level 3) at STEP 112 of process 102. At this level of the network, control system 74 follows STEPS 114-128 of process 102 for component nodes 20, 22, 26 and does not add any criticality to component nodes 20, 22, 26 because all nodes directly downstream therefrom have more than one incoming edge. However, for component node 18, control system 74 follows STEPS 114-128 of process 102, determines that the criticality of component node 30 should be added to component node 18 because component node 30 has no incoming edges other than incoming edge 44 linking component nodes 18, 30, and assigns a total criticality of 22 to component node 18. For component node 24, control system follows STEPS 114-128 of process 102, determines that the criticality of component node 32 should be added to component node 24 because component node 32 has no incoming edges other than incoming edge 64 linking component nodes 24, 32, and assigns a total criticality of 12 to component node 24. At STEP 130 of process 102, control system 74 determines that the complete network has not been scanned.

In panel 144, control system 74 moves to the level of nodes directly upstream from component nodes 18, 20, 22, 24, 26 including power source nodes 12, 14, 16 (Level 4) at STEP 112 of process 102. At this level of the network, control system 74 follows STEPS 114-128 of process 102 for power source nodes 12, 14, 16 and determines in each case that the criticality of a downstream node should be added to its criticality. For power source node 12, control system 74 determines that the criticality of component node 18 should be added to power source node 12 because component node 18 has no incoming edges other than incoming edge 42 linking power source node 12 and component node 18 and assigns a total criticality of 23 to power source node 12. For power source node 14, control system 74 determines that the criticality of component node 26 should be added to power source node 12 because component node 26 has no incoming edges other than incoming edge 58 linking power source node 14 and component node 26 and assigns a total criticality of 2 to power source node 14.

For power source node 16, control system 74 determines that the criticality of component node 22 should be added to power source node 16 because component node 22 has no incoming edges other than incoming edge 68 linking power source node 16 and component node 22 and assigns a total criticality of 2 to power source node 16. At STEP 130 of process 102, control system 74 determines that the complete network has been scanned. Control system 74 stops executing process 102 at STEP 132 and outputs the resulting criticalities of each power source and component node 12-32 as shown in panel 146 to risk calculator 92.

Beneficially, embodiments of the invention thus provide a control system for determining the risk each node of a power system poses to the power system, ranking the nodes according to risk, and developing a maintenance strategy for preventing power system failure. The control system retrieves power flow, diagnostic, and network model information for power system components and power sources and converts or transforms that information into a stress index, a health index, and a criticality for each power source and component in the power system. The stress index, health index, and criticality of each power source and component, along with forecasting information, are transformed or converted into a risk index for each power source and component of the power system. The health, stress, and risk indices, the criticality, and logistic information are used to create a maintenance strategy that allows maintenance personnel to optimize their time spent maintaining the power system in order to prevent power system failure.

According to one embodiment of the present invention, a power distribution network includes a plurality of power source nodes and component nodes. The component nodes direct power from the plurality of power source nodes to a plurality of load nodes. The power distribution network further includes a plurality of sensors positioned to sense power flow information for the plurality of power source and component nodes and a data warehouse housing the power flow information and diagnostic data for the plurality of power source and component nodes. The power distribution network additionally includes a control system configured to retrieve the power flow information and the diagnostic data for the plurality of power source and component nodes from the data warehouse. The control system is also configured to generate a stress index for each of the power source and component nodes from the power flow information, generate a health index for each of the power source and component nodes from the diagnostic information, and compute a criticality for each of the power source and component nodes using a model of the power distribution network. Furthermore, the control system is configured to generate a risk index for each of the power source and component nodes based on their respective stress index, health index, and criticality. The risk index of each node represents the risk the node poses to the power distribution network.

According to another embodiment of the present invention, a control system for assessing the risk of node failure to a power system having at least one power source node and a plurality of component nodes positioned to provide power from the at least one power source node to at least one load node is configured to extract power flow information and diagnostic information for the plurality of component nodes and the at least one power source node. The control system is also configured to convert the power flow information into a stress index for each component node, convert the diagnostic information and the stress index into a health index for each component node, and determine the criticality of each component node. The control system is further configured to convert the stress index, the health index, and the criticality of each component node into a respective risk index that symbolizes the risk each component node poses to the power system.

According to yet another embodiment of the present invention, a method for assessing the risk that power system assets pose to a power system includes defining at least one power source node and a plurality of component nodes within the power system. The plurality of component nodes are positioned to provide power from the at least one power source node to at least one load node. The method further includes obtaining power flow information and diagnostic information for the power source and component nodes from a data warehouse, transforming the power flow information into a stress index for each of the power source and component nodes, transforming the diagnostic information into a health index for each of the power source and component nodes, and evaluating a criticality for each of the power source and component nodes using a model of the power distribution network. The method also includes transforming the stress index, the health index, and the criticality of each power source and component node into a respective risk index, each risk index indicating the risk a node poses to the power distribution network.

The present invention has been described in terms of the preferred embodiment, and it is recognized that equivalents, alternatives, and modifications, aside from those expressly stated, are possible and within the scope of the appending claims.

What is claimed is:

1. A power distribution network comprising:
a plurality of power source and component nodes, the plurality of component nodes directing power from the plurality of power source nodes to a plurality of load nodes;
a plurality of sensors positioned to sense power flow information for the plurality of power source and component nodes;
a data warehouse housing the power flow information and diagnostic data for the plurality of power source and component nodes; and
a control system configured to:
retrieve the power flow information and the diagnostic data for the plurality of power source and component nodes from the data warehouse;
generate a stress index for each of the power source and component nodes from the power flow information;
generate a health index for each of the power source and component nodes from the diagnostic information;
compute a criticality for each of the power source and component nodes using a model of the power distribution network;
generate a risk index for each of the power source and component nodes based on their respective stress index, health index, and criticality, the risk index of each node representing the risk the node poses to the power distribution network; and
alter power flow between two nodes selected from the plurality of power source, component, and load nodes based on at least one of the stress index, the health index, and the risk index of a power source node, a component node, or a power source node and a component node.

2. The power distribution network of claim 1 wherein the control system is further configured to generate the health index of each component based on whether diagnostic information is available for the component.

3. The power distribution network of claim 1 wherein the control system is configured to calculate the criticality of a node by assessing whether any of the nodes downstream therefrom are completely dependent on the node for power availability.

4. The power distribution network of claim 1 wherein the control system is configured to alter power flow by:
taking a power source node offline based on at least one of the health index, the stress index, and the risk index of the power source node; and
re-routing power in the power system to compensate for the offline power source node.

5. The power distribution network of claim 1 wherein the control system is further configured to:

obtain forecasting data for each of the power source and component nodes from the data warehouse, the forecasting data including load, power generation, and weather forecasting data; and modify the risk index of each power source and component node based on the forecasting data.

6. The power distribution network of claim 1 wherein the health index, the stress index, and the criticality of each node is normalized before being used to generate the risk index for the node.

7. The power distribution network of claim 1 wherein the control system is further configured to rank each component and power source node based on at least one of health index, stress index, and risk index.

8. The power distribution network of claim 1 wherein the diagnostic information comprises historic fault and maintenance information and online sensor information for each component and power source node.

9. A control system for assessing the risk of node failure to a power system having at least one power source node and a plurality of component nodes positioned to provide power from the at least one power source node to at least one load node, the control system configured to:
extract power flow information and diagnostic information for the plurality of component nodes and the at least one power source node;
convert the power flow information into a stress index for each component node;
convert the diagnostic information and the stress index into a health index for each component node;
determine the criticality of each component node;
convert the stress index, the health index, and the criticality of each component node into a respective risk index that symbolizes the risk each component node poses to the power system; and
re-route power flow within the power system based on at least one of the stress index, the health index, and the risk index of a power source node, a component node, or a power source node and a component node.

10. The control system of claim 9 configured to re-route power flow within the power system by re-routing power supplied by a power source node of the plurality of power source nodes away from at least one component node of the plurality of component nodes based on at least one of the health index, the stress index, and the risk index of the component node.

11. The control system of claim 9 further configured to determine the criticality of each component node by:
assigning a unit criticality to each component and power source node;
determining a criticality for each load node; and
starting with nodes directly upstream from the load nodes, adding the criticality of each downstream node to the criticality of a node directly upstream therefrom if the downstream node has only one node directly upstream therefrom until a final criticality of each node in the power distribution network has been determined.

12. The control system of claim 9 further configured to:
convert the power flow information into a stress index for the at least one power source node;
convert the diagnostic information and the stress index of the at least power source node into a health index for the at least one power source node;
determine the criticality of each of the at least one power source node; and convert the stress index, the health index, and the criticality of the at least one power source node into a risk index.

13. The control system of claim 9 further configured to:
normalize the health index, stress index, and criticality of each component node; and
rank the component nodes according to risk by:
prioritizing all component nodes with a health index greater than a first predetermined value at a highest priority;
prioritizing all remaining component nodes with a combined health and stress index greater than a second predetermined value at a second highest priority; and
prioritizing all remaining component nodes according to their respective health index, stress index, and criticality.

14. The control system of claim 9 further configured to:
determine whether diagnostic data is available for the component nodes; and
adjust the risk index of a component node if no diagnostic data is available for the component node.

15. The control system of claim 9 further configured to:
extract forecasting data for each of the power source and component nodes from the data warehouse, the forecasting data including load, power generation, and weather forecasting data; and
alter the risk index of each component node based on the forecasting data.

16. A method for assessing the risk that power system assets pose to a power system, the method comprising:
defining at least one power source node and a plurality of component nodes within the power system, the plurality of component nodes positioned to provide power from the at least one power source node to at least one load node;
obtaining power flow information and diagnostic information for the power source and component nodes from a data warehouse;
transforming the power flow information into a stress index for each of the power source and component nodes;
transforming the diagnostic information into a health index for each of the power source and component nodes;
evaluating a criticality for each of the power source and component nodes using a model of the power distribution network;
transforming the stress index, the health index, and the criticality of each power source and component node into a respective risk index, each risk index indicating the risk a node poses to the power distribution network; and
adjusting power flow within the power system between two or more nodes selected from the at least one power source node, the plurality of component nodes, and the at least one load node based on one or more of stress, health, and risk indices of a power source node, a component node, or a power source node and a component node.

17. The method of claim 16 further comprising assigning a priority ranking to each component and power source node based on at least one of their health index, stress index, and risk index.

18. The method of claim 16 further comprising developing a maintenance strategy based on the risk indices of the power source and component nodes and logistic data including a cost for repairs, availability of components, and financial implications of a fault at any of the power source and component nodes.

19. The method of claim 16 wherein adjusting power flow within the power system comprises adjust power flow from the at least one power source node to the at least one load node based on the risk indices of the power source and component nodes.

20. The method of claim 16 wherein evaluating the criticality of the power source and component nodes comprises:
- assigning a unit criticality to the power source and component nodes;
- establishing a criticality for each load node; and
- increasing the criticality of a node if nodes directly downstream therefrom completely depend on the node for power.

* * * * *